(12) United States Patent
Bradfute et al.

(10) Patent No.: US 6,884,480 B2
(45) Date of Patent: Apr. 26, 2005

(54) FILM CONTAINING ALPHA-OLEFIN/VINYL AROMATIC COPOLYMER

(75) Inventors: John G. Bradfute, Greenville, SC (US); Blaine C. Childress, Inman, SC (US); Marvin R. Havens, Greer, SC (US); C. Michael Lulham, Gray Court, SC (US); Ronald D. Moffitt, Duncan, SC (US); Martindale Nelson, Greer, SC (US); Lawrence R. Norpoth, Greer, SC (US); William P. Roberts, Spartanburg, SC (US); Gloria G. Toney, Greer, SC (US); George D. Wofford, Duncan, SC (US)

(73) Assignee: Cryovac, Inc., Duncan, SC (US)

(*) Notice: Subject to any disclaimer, the term of this patent is extended or adjusted under 35 U.S.C. 154(b) by 0 days.

(21) Appl. No.: 09/951,228

(22) Filed: Sep. 11, 2001

(65) Prior Publication Data

US 2002/0025394 A1 Feb. 28, 2002

Related U.S. Application Data

(63) Continuation of application No. 08/875,360, filed as application No. PCT/US95/06198 on May 19, 1995, now abandoned.

(51) Int. Cl.$^7$ .............................................. B65B 53/00
(52) U.S. Cl. ...................................... 428/34.9; 428/349
(58) Field of Search .............................. 428/34.9, 349, 428/35.7, 36.6, 36.7, 476.1, 476.9, 515, 520

(56) References Cited

U.S. PATENT DOCUMENTS

| | | |
|---|---|---|
| 3,117,945 A | 1/1964 | Gorham et al. ............ 260/45.5 |
| 3,682,767 A | 8/1972 | Britton et al. .............. 161/227 |
| 4,076,698 A | 2/1978 | Anderson et al. ......... 526/348.6 |
| 4,252,849 A | 2/1981 | Nishimura et al. .......... 428/192 |
| 4,302,565 A | 11/1981 | Goeke et al. ................ 526/88 |
| 4,847,148 A | 7/1989 | Schirmer .................... 428/332 |
| 5,118,561 A | 6/1992 | Gusavage et al. ........ 428/304.4 |
| 5,128,196 A | 7/1992 | Luetkens et al. ............ 428/213 |
| 5,206,075 A | 4/1993 | Hodgson et al. ............ 428/216 |
| 5,241,031 A | 8/1993 | Mehta ..................... 526/348.1 |

(Continued)

FOREIGN PATENT DOCUMENTS

| | | |
|---|---|---|
| EP | 0 145 945 | 6/1985 |
| EP | 0 360 385 | 7/1989 |
| EP | 0 337 316 | 10/1989 |
| EP | 0 363 895 | 10/1989 |

(Continued)

OTHER PUBLICATIONS

"Effect of Long Branches on the Flow Properties of Polymers", Graessley, Dept. of Chemical Engineering & Materials Science, Northwestern University, Evanston, ILL, 1977, pp 322–337.

(Continued)

Primary Examiner—Sandra M. Nolan
(74) Attorney, Agent, or Firm—Rupert B. Hurley, Jr.

(57) ABSTRACT

Film and sheet materials, and articles made therefrom, such as bags, pouches, trays, etc., comprise one or more layers of homogeneous alpha-olefin/vinyl aromatic copolymer, preferably an ethylene/styrene copolymer. The alpha-olefin/vinyl aromatic copolymer has properties which can provide a desired performance characteristics such as impact resistance, printability, RF sealability, free shrink, optics, high permeability, etc. The homogeneous alpha-olefin/vinyl aromatic copolymer may be present in a monolayer film, either alone or in a blend, or may be included in one or more layers of a multilayer film. Also included is a multilayer thermoformable article comprising a web having a film of such alpha-olefin/vinyl aromatic copolymers thereto.

20 Claims, 2 Drawing Sheets

Comparison of the Ratio of Relaxed to Unrelaxed Storage Moduli for the Beta Relaxation for Various Poly(ethylene-co-styrene) and Poly(ethylene-co-1-alkene) Copolymers as a Function of the Mass Percentage of Crystallinity

U.S. PATENT DOCUMENTS

| | | | |
|---|---|---|---|
| 5,272,236 A | | 12/1993 | Lai et al. ............... 526/348.5 |
| 5,278,272 A | | 1/1994 | Lai et al. ............... 526/348.5 |
| 5,369,136 A | | 11/1994 | Park et al. ............... 521/143 |
| 5,369,137 A | | 11/1994 | Paquet et al. ............ 521/146 |
| 5,427,807 A | | 6/1995 | Chum et al. .............. 426/393 |
| 5,562,958 A | | 10/1996 | Walton et al. ........... 428/34.9 |
| 5,604,043 A | | 2/1997 | Ahlgren ..................... 428/518 |
| 5,658,625 A | * | 8/1997 | Bradfute et al. ......... 428/34.9 |
| 5,703,187 A | * | 12/1997 | Timmers .................. 526/282 |
| 5,837,335 A | * | 11/1998 | Babrowicz ............... 428/34.9 |
| 5,872,201 A | | 2/1999 | Cheung et al. ........... 526/282 |
| RE37,699 E | * | 5/2002 | Bradfute et al. ......... 428/34.9 |

FOREIGN PATENT DOCUMENTS

| | | |
|---|---|---|
| EP | 0 390 442 | 3/1990 |
| EP | 0 502 330 | 2/1991 |
| EP | 0 416 815 | 3/1991 |
| EP | 0 481 081 | 4/1992 |
| EP | 0 570 931 | 11/1993 |
| EP | 0 572 990 | 12/1993 |
| EP | 0 597 502 | 5/1994 |
| EP | 0 600 425 | 6/1994 |
| GB | 2 115 348 | 7/1983 |
| GB | 2 216 845 | 10/1989 |
| JP | 08142243 | 6/1996 |
| WO | WO 90/03414 | 4/1990 |
| WO | WO 93/03093 | 2/1993 |
| WO | WO 93/12151 | 6/1993 |
| WO | WO 93/24312 | 11/1993 |
| WO | WO 94/00500 | 1/1994 |
| WO | WO 94/07954 | 4/1994 |
| WO | WO 94/09060 | 4/1994 |
| WO | WO 95/01397 | 1/1995 |
| WO | WO 95/27755 | 10/1995 |
| WO | WO 95/32095 | 11/1995 |

OTHER PUBLICATIONS

"Viscoelastic Properties of Poly (ethylene–co–styrene) Copolymers", A. Lobbrecht, CHR. Friedrich, F.G. Sernetz R. Mulhaupt, pp 209–215.

"Creep Behavior of Amorphous Ethylene–Styrene Interpolymers in the Glass Transition Region", N.Y. Chem, E.V. Stepanov, S.P. Chum, A. Hiltner, E.Bair, pp 2373–2374.

Encyclopedia of Polymer Science and Engineering, vol. 7, Fibers, Optical to Hydrogenation, A Wiley=Interscience Publication, John Wiley & Sons, pp 10–14.

L. Wild et al, "Determination of Branching . . . " Copolymers, *Journal of Polymer Science; Polymer Physics Edition*, vol. 20, 441–455 (1982).

Leaver, "Polyolefins Gain Higher . . . ", *Modern Plastics*, pp. 46–49 (Oct. 1991).

Shut "Enter a New Generation . . . ", *Plastics Technology*, pp 15–19 (Nov. 1991).

Naitove Technology News, *Plastics Technology*, p. 25 (Nov. 1992).

Soga "Copolymerization of Ethylene . . . ", *Polymer Bulletin*, 20, pp 237–241 (Sep. 1988).

(No Author) "EXXON Cites Breakthrough in Olefins . . . ", *Modern Plastics*, pp 61–62 (Jul. 1991).

Horton, A.D., "Metallocene Catalysis: Polymers by Design?" *Trends in Polymer Science*, vol. 2, No. 5, pp 158–166 (May 1994).

(No Author) Encyclopedia of Polymer Science and Technology, Edition 1985, vol. 7, pp 80–81.

Reinking, M.K. et al, "Mechanistic Studies on . . . Polyethylene", SPE Polyolefins 2000, pp 269 and 277 (2000).

W. Graessley, "Effects of Long Branches . . . Polymers", *Accounts of Chem. Res.*, 10, Table I, (1977).

Lobbrecht, A. et al, "Viscoelastic Properties . . . Copolymers", *J. App. Polymer Science*. 75. 2–0. 213. 215 (1997).

Sukhova, T.A. et al, "Catalytic Systems . . . With Styrene", *Journal of Polymer Science: Polymer Chemistry*, (1999) pp 1083–1092.

Chen, N.Y., et al, "Creep Behavior . . . Region", *Journal of Polymer Science: Part B: Polymer Physics*, vol. 37, pp 2373–2374 (1999).

"Dow Resins for Packaging", p. 7.3, col. 1, lines 1–12, Dow Plastics (Feb. 1999).

Kuroda "Sequencing and Branching . . . ", *Macromolecules*, pp 2820–2827, vol. 25 (1992).

Miller Technology Watch—Polymer Engineering, *Plastics World*, p. 29 (Nov. 1991).

*Plastics Technology*, p. 25 (Sep. 1992) (unable to get a copy).

Protest Under 37 CFR § 1.291(a) Against Reissue U.S. Appl. No. 09/357,531 (US 5628625), pp. 1–14, including Transmittal Letter (1 pg), Appenix I (also referred to as "Appendix A"), pp 1–12, and Appendix B (untitled) pp 1–17.

Preliminary Remarks Under 37 CFR 1.115 Filed Mar. 13, 2000 re: Reissue of 5628625.

* cited by examiner

Comparison of the Ratio of Relaxed to Unrelaxed Storage Moduli for the Beta Relaxation for Various Poly(ethylene-co-styrene) and Poly(ethylene-co-1-alkene) Copolymers as a Function of the Mass Percentage of Crystallinity Peak Beta Relaxation Temperature as a Function of the Mass Percentage Crystallinity for Various Poly(ethylene-co-styrene) and Linear Homogeneous Poly(ethylene-co-1-alkene) Copolymers

US 6,884,480 B2

FILM CONTAINING ALPHA-OLEFIN/VINYL AROMATIC COPOLYMER

CROSS REFERENCE TO RELATED APPLICATIONS

This is a continuation of U.S. Ser. No. 08/875,360, filed on May 4, 1998, abandoned, which is a 371 of PCT/US95/06198, filed May 19, 1995, which claims priority from U.S. Ser. No. 08/248,799, filed May 25, 1994, now U.S. Pat. No. 5,658,625.

FIELD OF THE INVENTION

The present invention relates to films comprising olefin/vinyl aromatic copolymer. The present invention relates especially to multilayer films containing ethylene/styrene copolymer.

BACKGROUND OF THE INVENTION

Homogeneous olefin/vinyl aromatic copolymers have been prepared, using single site catalysts such as metallocene catalysts. These polymers have only up to 50 mole percent of the aromatic vinyl polymerization units, because the active site of the catalyst becomes crowded with the incorporation of the sterically hindered aromatic vinyl comonomer, making it unlikely, or impossible, that another hindered comonomer could enter into the polymerization as the next monomer in the sequence. These homogeneous alpha-olefin/vinyl aromatic copolymers are similar in at least some properties to other homogeneous, single site catalyzed copolymers such as the homogeneous, single site catalyzed ethylene/alpha-olefin copolymers. That is, the present alpha-olefin/vinyl aromatic copolymers are characterized as having a narrow molecular weight distribution (MWD) and a narrow compositional distribution (CD).

SUMMARY OF THE INVENTION

It has been discovered that homogeneous alpha-olefin/vinyl aromatic copolymers can be used to prepare heat shrinkable films having a high impact strength. This high impact strength is believed to result from the stiffer amorphous regions of the polymer. Furthermore, it is believed that films containing homogeneous alpha-olefin/vinyl aromatic copolymer can have a high permeability to gaseous oxygen, etc., due to high void volume and/or high solubility of gases in homogeneous alpha-olefin/vinyl aromatic copolymers.

Furthermore, the high void volume and/or polarizability of homogeneous alpha-olefin/vinyl aromatic copolymer, when used in films, can be used to make films having an increased capacity for absorption of relatively low molecular weight additives, such as antifog additives, antiblock additives, and antislip additives. Furthermore, the voids can be used to make films having the characteristic of taking up and retaining flavor additives, color additives, printing inks, etc., which can result in less contamination into the product within the package, or from one product to another.

Furthermore, olefin/vinyl aromatic copolymers can be used to make films having good clarity and/or gloss, in combination with stiffness due to the aromatic component in the polymer.

The use of olefin/vinyl aromatic copolymers in films, both monolayer films as well as multilayer films, can provide one or more of a wide variety of improved properties to the film, and can be advantageous in certain end uses. For example, a film of improved printability, e.g. improved ink adhesion, can be prepared using monomers having the polarity of olefin/vinyl aromatic copolymers. Olefin/vinyl aromatic copolymers can be used to provide a machinable film having a high gas transmission rate, which is advantageous in both case-ready meat packaging of fresh meat, especially fresh red meat, as well as in the packaging of produce.

Films comprising homogeneous alpha-olefin/vinyl aromatic polymer can also be used:

in tie layers of multilayer films, to improve interply adhesion, especially to polar polymers and styrenic polymers;

to prepare films having good sealability, in terms of improved hot tack, improved seal strength, and/or seal initiation temperature;

to prepare films having improved thermoforming characteristics, such as improved deep draw characteristics;

to provide films having improved organoleptic characteristics;

to provide films having a lower level of extractables;

to provide films having improved low-temperature shrink characteristics;

to provide films having improved wettability;

to provide films having improved slip properties;

to provide films which are RF sealable;

to films having enhanced sealability after irradiation;

Olefin/vinyl aromatic copolymers can also be used in the preparation of foams, especially foam sheet, having improved thermoforming characteristics, especially in having improved resistance to cracking. The olefin/vinyl aromatic copolymer can be used to provide a polystyrene barrier tray, such as a barrier foam tray, with improved delamination resistance and structural integrity. These advantages may be obtained by using the homogeneous alpha-olefin/vinyl aromatic copolymer in combination with other styrenic polymers, e.g., polystyrene homopolymer.

As a first aspect, the present invention is directed to a heat shrinkable film comprising an oriented film layer comprising a homogeneous alpha-olefin/vinyl aromatic copolymer, present in an amount of from about 30 to 100 weight percent, based on the weight of the film layer. The homogeneous alpha-olefin/vinyl aromatic copolymer has a vinyl aromatic mer content of from about 1–50 mole percent.

The homogeneous alpha-olefin/vinyl aromatic copolymer in the film of the present invention comprises recurring units of the formula:

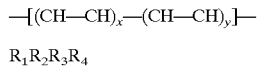

In the formula, x is greater than or equal to y, i.e., there must be a mole fraction of polymerization units (mers) derived from the alpha-olefin monomer (a mole fraction represented by "x", as determined by $x/\{x+y\}$) which is at least as great as the mole fraction of the polymerization units derived from the aromatic monomer (a mole fraction represented by "y", as determined by $y/\{x+y\}$). $R_1$ comprises at least one member selected from the group consisting of hydrogen, $C_1$ alkyl, $C_2$ alkyl, $C_3$ alkyl, $C_4$ alkyl, $C_5$ alkyl, and $C_6$ alkyl. $R_2$ comprises at least one member selected from the group consisting of hydrogen, $C_1$ alkyl, $C_2$ alkyl, $C_3$ alkyl, $C_4$ alkyl, $C_5$ alkyl, and $C_6$ alkyl. Both $R_1$ and $R_2$ cannot both be alkyl. $R_3$ comprises a member selected from the group consisting of hydrogen, aromatic, and mixtures thereof. $R_4$ is a member selected from the group consisting of hydrogen, aromatic, and mixtures thereof, provided that one member, and only one member, selected from the group consisting of $R_3$ and $R_4$ is aromatic. Furthermore, a copolymer portion between every two adjacent members selected from the group consisting of aromatic $CHR_3$ and aromatic $CHR_4$ comprises at least two —$CH_2$— groups.

A preferred film comprises a composition comprising (a) at least one member selected from the group consisting of homogeneous ethylene/vinyl aromatic copolymer and homogeneous propylene/vinyl aromatic copolymer; and (b) at least one member selected from the group consisting of polyethylene homopolymer, polypropylene homopolymer, ethylene/aliphatic alpha-olefin copolymer, ethylene/vinyl ester copolymer, ethylene/acrylic ester copolymer, ethylene/acrylic acid copolymer, polystyrene homopolymer, styrene/aliphatic diene copolymer, propylene/aliphatic alpha-olefin copolymer, and ionomer.

Preferably, the homogeneous alpha-olefin/vinyl aromatic copolymer comprises ethylene mer and styrene mer. Preferably, the ethylene mer is present in an amount of from about 75 mole percent to about 99 mole percent, and the styrene mer is present in an amount of from about 1 mole percent to 25 mole percent.

In another preferred film, the homogeneous alpha-olefin/vinyl aromatic copolymer comprises propylene mer and styrene mer.

Optionally, the homogeneous alpha-olefin/vinyl aromatic copolymer comprises a crosslinked polymer network.

Preferably, the film of the invention has a free shrink, at 90□C, of at least 30 percent in at least one direction. Preferably, the film comprises a film layer having a modulus of from about 5,000 to 150,000 psi; more preferably, from about 10,000 to 150,000 psi.; still more preferably, from about 15,000 to 50,000 psi.

Preferably, the film is a multilayer film, and although the film can be asymmetrical, symmetrical multilayer films provide a balanced structure which can be advantageous.

Another preferred multilayer film comprises a first layer and a second layer. The first layer is an oxygen barrier layer and the second layer comprises the homogeneous alpha-olefin/vinyl aromatic copolymer. The oxygen barrier layer preferably comprises at least one member selected from the group consisting of ethylene/vinyl alcohol copolymer, polyvinylidene chloride, polyamide, polyacrylonitrile, polyester, and silica.

Still another preferred multilayer film comprises a first layer and a second layer. The first layer comprises at least one member selected from the group consisting of polyolefin, polyamide, polyester, and the second layer comprises the homogeneous alpha-olefin/vinyl aromatic copolymer. Preferably, the polyolefin comprises at least one member selected from the group consisting of polyethylene homopolymer, polypropylene homopolymer, ethylene/aliphatic alpha-olefin copolymer, ethylene/vinyl ester copolymer, ethylene/acrylic ester copolymer, ethylene/acrylic acid copolymer, polystyrene homopolymer, styrene/aliphatic diene copolymer, propylene/aliphatic alpha-olefin copolymer, and ionomer.

As a second aspect, the present invention pertains to a printed film comprising a film layer comprising a homogeneous alpha-olefin/vinyl aromatic copolymer in an amount of from about 30 to 100 weight percent, based on the weight of the film layer. The film layer has printing thereon, and the homogeneous alpha-olefin/vinyl aromatic copolymer has a vinyl aromatic mer content of from about 1–50 mole percent. Preferably, the printed film is a multilayer film, with the film layer being an outer film layer having printing on an outer surface thereof.

As a third aspect, the present invention pertains to a multilayer film comprising an outer sealing layer, an inner oxygen barrier layer, an inner core layer, and an outer abuse layer. At least one member selected from the group consisting of the outer sealing layer and the inner core layer comprises homogeneous alpha-olefin/vinyl aromatic copolymer. Polyamide is present in at least one member selected from the group consisting of the inner oxygen barrier layer, the inner core layer, and the outer abuse layer.

As a fourth aspect, the present invention pertains to a thermoformed article comprising a multilayer film comprising an outer sealing layer, an inner oxygen barrier layer, an inner core layer, and an outer abuse layer. At least one member selected from the group consisting of the outer sealing layer and the inner core layer comprises homogeneous alpha-olefin/vinyl aromatic copolymer. Furthermore, polyamide is present in at least one member selected from the group consisting of the inner oxygen barrier layer, the inner core layer, and the outer abuse layer.

As a fifth aspect, the present invention pertains to a patch bag comprising a heat-shrinkable patch adhered to a heat-shrinkable bag. The heat-shrinkable patch comprises a first heat-shrinkable film, and the heat-shrinkable bag comprises a second heat-shrinkable film. At least one member selected from the group consisting of the first heat-shrinkable film and the second heat-shrinkable film comprises a film layer comprising homogeneous alpha-olefin/vinyl aromatic copolymer.

As a sixth aspect, the present invention pertains to a laminate comprising a foam sheet and a film adhered to the foam sheet. At least one member selected from the group consisting of the foam sheet and the film comprises homogeneous alpha-olefin/vinyl aromatic copolymer. The foam sheet comprises polystyrene. Preferably, the foam sheet further comprises a composition comprising polystyrene homopolymer and homogeneous alpha-olefin/vinyl aromatic copolymer. [As used herein, the phrase "polystyrene homopolymer" is inclusive of polystyrene block and graft copolymers comprising styrene mer in an amount of at least 50 weight percent, based on the weight of the copolymer.] Preferably, the film is a multilayer film comprising a composition which comprises homogeneous alpha-olefin/vinyl aromatic copolymer. The composition is directly adhered to the foam sheet. The film further comprises an oxygen barrier layer.

As a seventh aspect, the present invention pertains to a package comprising a rigid container having a flexible lid adhered directly thereto. The rigid container comprises polystyrene, and the flexible lid comprises homogeneous alpha-olefin/vinyl aromatic copolymer.

As an eighth aspect, the present invention pertains to a package comprising a rigid container having a flexible lid adhered directly thereto. The rigid container comprises polystyrene, and the flexible lid comprises polyolefin. At least one member selected from the group consisting of the rigid container and the flexible lid further comprises homogeneous alpha-olefin/vinyl aromatic copolymer.

DETAILED DESCRIPTION OF THE INVENTION

Figure 1:
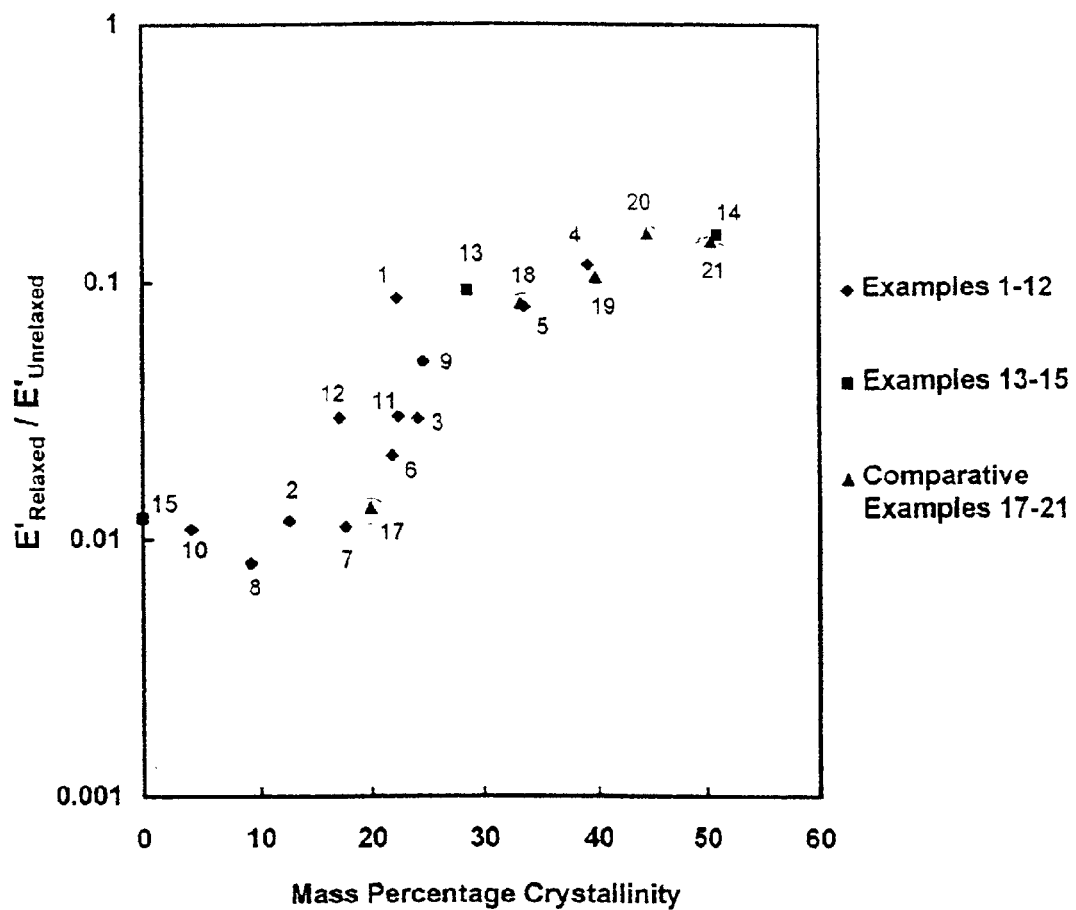
FIG. 1 is a plot of data points for the films of Examples 1–16 and Comparative Examples 17–21, the plot being of: (a) a ratio of relaxed to unrelaxed storage moduli for the beta relaxation, versus (b) mass percent crystallinity.

As used herein, the term "sealed" refers to any and all means of closing a package, such as heat sealing via hot air and/or heated bar, ultrasonic sealing, and even the use of clips on, for example, a shirred casing, etc.

As used herein, "EVOH" refers to ethylene vinyl alcohol copolymer. EVOH includes saponified or hydrolyzed ethylene vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably at least 50% and more preferably at least 85%.

As used herein, the term "barrier", and the phrase "barrier layer", as applied to films and/or film layers, are used with reference to the ability of a monolayer film or a multilayer film to serve as a barrier to one or more gases. Oxygen barrier layers can comprise, for example, polymerized ethylene vinyl alcohol, polyvinyl chloride, polyvinylidene chloride, polyamide, polyester, polyacrylonitrile, etc., as known to those of skill in the art. Preferably, the oxygen barrier layer comprises polymerized ethylene vinyl alcohol, polyvinyl chloride, polyvinylidene chloride, and polyamide, as known to those of skill in the art.

As used herein, "oxygen transmission rate", also referred to as "OTR" and "oxygen permeability", is measured according to ASTM D 3985, a test known to those of skill in the film art.

As used herein, the term "lamination", and the phrase "laminated film", refer to the process, and resulting product, made by bonding together two or more layers of film or other materials. Lamination can be accomplished by joining layers with adhesives, joining with heat and pressure, and even spread coating and extrusion coating. The term laminate is also inclusive of coextruded multilayer films comprising one or more tie layers.

The term "oriented", as used herein, refers to oriented films or film layers, wherein the orientation can be produced in one or more of a variety of manners. Many of the thermoplastic films of the present invention are heat-shrinkable. The term "oriented" is used herein interchangeably with the term "heat shrinkable" with each of these terms designating a material which has been elongated, and thereafter "set", by cooling while substantially retaining its oriented dimensions. An oriented material will tend to return to its original unoriented (unextended) dimensions when heated to an appropriate elevated temperature. The orientation may be accomplished in many ways such as, for example, by "blown bubble" techniques or "tenter framing." These processes are well known to those skilled in the art.

The phrases "substantially oriented" and "heat shrinkable", as used herein with respect to films, requires elongation of at least 50 percent in at least one direction, with the elongation being carried out at a temperature below the melting point of, and/or below the glass transition temperature of, the homogeneous alpha-olefin/vinyl aromatic copolymer, without subsequent annealing of the film.

As used herein, the phrase "orientation ratio" refers to the multiplication product of the extent to which the plastic film material is expanded in several directions, usually two directions perpendicular to one another. The degree of orientation is also referred to as the orientation ratio, or sometimes as the "racking ratio".

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc. In general, the layers of a film can consist essentially of a single polymer, or can have still additional polymers blended therewith.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene. The term copolymer is inclusive of random copolymers, block copolymers, graft copolymers, etc.

As used herein, the term "polymerization" is inclusive of homopolymerizations, copolymerizations, terpolymerizations, etc., and includes all types of copolymerizations such as random, graft, block, etc. In general, the polymers, in the films used in accordance with the present invention, can be prepared in accordance with any suitable catalytic polymerization process, including solution polymerization, slurry polymerization, gas phase polymerization, and high pressure polymerization processes.

As used herein, the term "copolymerization" refers to the simultaneous polymerization of two or more monomers.

As used herein, a copolymer identified in terms of a plurality of monomers, e.g., "propylene/ethylene copolymer", refers to a copolymer in which either monomer copolymerizes in a higher weight or molar percent. However, the first listed monomer preferably is polymerizes in a higher weight percent than the second listed monomer, and, for copolymers which are terpolymers, quadripolymers, etc., preferably, the first monomer copolymerizes in a higher weight percent than the second monomer, and the second monomer copolymerizes in a higher weight percent than the third monomer, etc.

As used herein, terminology employing a "/" with respect to the chemical identity of a copolymer (e.g., "an ethylene/alpha-olefin copolymer"), identifies the comonomers which are copolymerized to produce the copolymer. Such phrases as "ethylene/alpha-olefin copolymer" is the respective equivalent of "ethylene/alpha-olefin copolymer."

As used herein, the phrase "heterogeneous polymer" refers to polymerization reaction products of relatively wide variation in molecular weight and relatively wide variation in composition distribution, i.e., polymers made, for example, using conventional Ziegler-Natta catalysts. Heterogeneous polymers are useful in various layers of the film used in the present invention. Such polymers typically contain a relatively wide variety of chain lengths and comonomer percentages.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers exhibit a relatively even sequencing of comonomers within a chain, the mirroring of sequence distribution in all chains, and the similarity of length of all chains, and are typically prepared using metallocene, or other single-site type catalysis.

More particularly, homogeneous copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous copolymers useful in this invention will have a ($M_w/M_n$) of less than about 3.5. Preferably, the ($M_w/M_n$) will have a range of about 1.9 to 2.9. More preferably, the ($M_w/M_n$) will have a range of about 1.9 to 2.5. Preferably, the composition distribution breadth index (CDBI) of such homogeneous copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. CDBI determination clearly distinguishes the homogeneous copolymers used in the present invention (narrow composition distribution as assessed by CDBI values generally above 70%) from VLDPEs available commercially which generally have a broad composition distribution as assessed by CDBI values preferably less than 55%. The CDBI of a copolymer is readily calculated from data obtained from techniques known in the art, such as, for example, temperature rising elution fractionation (TREF) as described, for example, in Wild et. al., *J. Poly. Sci. Poly. Phys. Ed.*, Vol. 20, p.441 (1982). More preferably, the homogeneous copolymers have a CDBI of from about 70% to 99%. In general, the homogeneous copolymers in the films of the present invention also exhibit a relatively narrow melting point range, in comparison with "heterogeneous copolymers", i.e., polymers having a CDBI of less than 55%.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing homogeneous ethylene/alphaolefin copolymers are disclosed in U.S. Pat. Nos. 5,206,075, 5,241,031, and PCT International Application WO 93/03093, each of which is hereby incorporated by reference thereto, in its entirety. Further details regarding the production and use of one genus of homogeneous ethylene/alphaolefin copolymers are disclosed in U.S. Pat. No. 5,206,075, to HODGSON, Jr.; U.S. Pat. No. 5,241,031, to MEHTA; PCT International Publication Number WO 93/03093, in the name of Exxon Chemical Company; PCT International Publication Number WO 90/03414, in the name of Exxon Chemical Patents, Inc., all four of which are hereby incorporated in their entireties, by reference there. Still another genus of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated in their entireties, by reference thereto.

As used herein, the phrase "vinyl aromatic", with respect to monomers, refers to styrene, vinylnaphthalene, and vinylanthracene, with or without one or more substituents (for hydrogens) present on the aromatic ring(s), and/or the olefin carbon connected to the aromatic ring. The substituents could also include one or more additional vinyl groups. Furthermore, this phrase is used herein with reference to mers, i.e, polymerization units, of the above monomers. Preferably, the vinyl aromatic monomer is styrene.

As used herein, the phrase "alpha-olefin", and the phrase "alpha-olefin monomer", refer to olefinic compounds, and mers, whether unsubstituted or substituted, in which the first two carbon atoms in the chain have a double bond therebetween. As used herein, both of these phrases are inclusive of ethylene and propylene. Furthermore, the phrase "aliphatic alpha-olefin" refers to alpha-olefin monomers (and mers) which do not contain an aromatic moiety (i.e, group, substituent) therein, and which are hydrocarbons, i.e., contain only carbon and hydrogen atoms.

As used herein, the phrase "polymerization unit", and the term "mer", refer to a unit of a polymer derived from a monomer used in the polymerization reaction. For example, the phrase "alpha-olefin polymerization units" refers to a unit in, for example, an alpha-olefin/vinyl aromatic copolymer, the polymerization unit being that residue which is derived from the alpha-olefin monomer after it reacts to become a component of the polymer chain.

As used herein, the phrase "vinyl aromatic polymerization unit" refers to a corresponding polymerization unit of the polymer from the polymerization, which is the residue derived from the vinyl aromatic monomer after it reacts to become a component of the polymer chain.

As used herein, copolymers, terpolymers, etc. are named in terms of the monomers from which they are produced. For example, an "ethylene/alpha-olefin copolymer" is a copolymer comprising polymerization units derived from the copolymerization of ethylene monomer and alpha-olefin monomer, with or without additional comonomer(s). Likewise, an alpha-olefin/vinyl aromatic copolymer is a copolymer comprising polymerization units derived from the copolymerization of alpha-olefin monomer with vinyl aromatic comonomer, with or without additional comonomer(s).

As used herein, the term "polyolefin" refers to any polymerized olefin, which can be linear, branched, cyclic, aliphatic, aromatic, substituted, or unsubstituted. More specifically, included in the term polyolefin are homopolymers of olefins, copolymers of olefins, copolymers of an olefin and an non-olefinic comonomer copolymerizable with the olefin, such as vinyl monomers, modified polymers thereof, and the like. Specific examples include polypropylene homopolymers, polyethylene homopolymers, polybutene, propylene/alpha-olefin copolymers, ethylene/alphaolefin copolymers, butene/alpha-olefin copolymers, ethylene/vinyl acetate copolymers, ethylene/ethyl acrylate copolymers, ethylene/butyl acrylate copolymers, ethylene/ methyl acrylate copolymers, ethylene/acrylic acid copolymers, ethylene/methacrylic acid copolymers, modified polyolefin resins, ionomer resins, polymethylpentene, etc. The modified polyolefin resins include modified polymers prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of "blends" of such polymers with other polymers of a different type.

As used herein, the term "polypropylene" refers to any polymer comprising propylene polymerization units, regardless of whether the polymer is a homopolymer or a copolymer, and further includes blends of such homopolymers and copolymers. The phrase "propylene polymerization units", as used herein, refers to polymerization units in a polymer chain, the repeating units being derived from the polymerization of unsubstituted propylene monomer and/or substituted propylene polymer, the double bond being opened in the polymerization reaction.

As used herein, the phrase "anhydride functionality" refers to any form of anhydride functionality, such as the anhydride of maleic acid, fumaric acid, etc., whether blended with one or more polymers, grafted onto a polymer, or copolymerized with a polymer, and, in general, is also inclusive of derivatives of such functionalities, such as acids, esters, and metal salts derived therefrom. Polymers having anhydride functionalities thereon are typically used in tie layers.

As used herein, the phrase "modified polymer", as well as more specific phrases such as "modified ethylene vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

As used herein, the phrase "ethylene/alpha-olefin copolymer" refers to such heterogeneous materials as linear low density polyethylene (LLDPE), and very low and ultra low density polyethylene (VLDPE and ULDPE); and homogeneous polymers such as metallocene catalyzed polymers such as EXACT™ materials supplied by Exxon, and TAFMER™ materials supplied by Mitsui Petrochemical Corporation. These materials generally include copolymers of ethylene with one or more comonomers selected from $C_4$ to $C_{10}$ alpha-olefins such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. LLDPE, as used herein, has a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from the Dow Chemical Company, known as AFFINITY™ resins, are also included as another type of alpha-olefin copolymer useful in the present invention.

In general, the ethylene/alpha-olefin copolymer comprises a copolymer resulting from the copolymerization of from about 80 to 99 weight percent ethylene and from 1 to 20 weight percent alpha-olefin. Preferably, the ethylene/alpha-olefin copolymer comprises a copolymer resulting from the copolymerization of from about 85 to 95 weight percent ethylene and from 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "outer layer" refers to any film layer of a multilayer film having only one of its principal surfaces directly adhered to another layer of the film.

As used herein, the phrase "inside layer" refers to the outer layer, of a multilayer film packaging a product, which is closest to the product, relative to the other layers of the multilayer film.

As used herein, the phrase "outside layer" refers to the outer layer, of a multilayer film packaging a product, which is furthest from the product relative to the other layers of the multilayer film.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "core", and the phrase "core layer", as applied to multilayer films, refer to any inner (i.e., internal) film layer which has a primary function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

As used herein, the phrases "seal layer", "sealing layer", "heat sealing layer" and "sealant layer", refers to an outer film layer, or layers, involved in the sealing of the film to itself or the other outer layer of the same film, or an outer layer of another film, or article. It should also be recognized that in general, up to the outer 3 mils of a film can be involved in the sealing of the film to itself or another layer. With respect to packages having only fin-type seals, as opposed to lap seals, the phrase "sealant layer" generally refers to the inside film layer of a package, as well as supporting layers adjacent this sealant layer often being sealed to itself, and frequently serving as a food contact layer in the packaging of foods. In general, a heat sealing layer comprises any thermoplastic polymer; preferably, the heat-sealing layer comprises, for example, thermoplastic polyolefin, thermoplastic polyamide, thermoplastic polyester, and thermoplastic polyvinyl chloride; more preferably, thermoplastic polyolefin; still more preferably thermoplastic polyolefin having less than 60 weight percent crystallinity.

As used herein, the phrase "tie layer" refers to any inner layer having the primary purpose of adhering two layers to one another. In general, suitable polymers for use in tie layer include polymers having polar functional groups.

As used herein, the phrase "abuse layer" refers to an outer film layer and/or an inner film layer, so long as the film layer serves to resist abrasion, puncture, and other potential causes of reduction of package integrity, as well as potential causes of reduction of package appearance quality. Abuse layers can comprise any polymer, so long as the polymer contributes to achieving an integrity goal and/or an appearance goal; preferably, abuse layers comprise polymer having a modulus of at least $10^7$ Pascals, at room temperature.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

As used herein, the phrase "free shrink" refers to the percent dimensional change in a 10 cm×10 cm specimen of film, when subjected to selected heat, as measured by ASTM D 2732, as known to those of skill in the art.

The homogeneous alpha-olefin/vinyl aromatic copolymers to be used in the films of the present invention are described, in general and with respect to many specifics including the structure of the copolymer and methods for preparation of the copolymer, in: (1) EP 0 416 815 A2, to STEVENS, et. al., in the name of The Dow Chemical Company; (2) WO 94/00500, to R. B. PANNELL, et. al., in the name of Exxon Chemical Patents, Inc., and (3) *Plastics Technology*, p. 25 (September 1992), each of which is hereby incorporated by reference thereto, in its entirety.

The thermoplastic films of the present invention are preferably formed by extrusion processes and, most preferably, by art-known coextrusion methods. Following coextrusion the film is cooled to a solid state by, for example, cascading water or chilled air quenching. For some structures a precursor film layer or layers may be formed by extrusion with additional layers thereafter being extrusion coated thereon to form multilayer films. Two multilayer tubes may also be formed with one of the tubes thereafter being coated or laminated onto the other.

The extrusion coating method of film formation is preferable to coextruding the entire film when it is desired to subject one or more layers of the film to a treatment which may be harmful to one or more of the other layers. That is, film production via extrusion coating is preferable to production via pure coextrusion, if it is desired to irradiate one or more layers of a film with high energy electrons (see the discussion of irradiation, as set forth below), without-irradiating additional layers one or more of which comprises a barrier layer comprising one or more copolymers of vinylidene chloride (e.g., Saran™), such as vinylidene chloride/vinyl chloride, vinylidene chloride/methyl acrylate, vinylidene chloride/ethyl acrylate or vinylidene chloride/acrylonitrile.

Films formed via extrusion coating would, for example, comprise those where the barrier layer is a vinylidene chloride copolymer layer in addition to or instead of an ethylene vinyl alcohol (EVOH) copolymer layer. Those skilled in the art generally recognize that irradiation with high energy electrons is generally harmful to such vinylidene chloride copolymer barrier layer compositions, as irradiation may degrade and discolor the vinylidene chloride copolymer, making it turn brown. Thus, if full coextrusion followed by high energy electron irradiation of the multilayer structure is carried out on a film having a vinylidene chloride copolymer barrier layer, the irradiation should be conducted at low levels. However, it is preferable to altogether avoid subjecting irradiation-sensitive polymers, such as vinylidene chloride copolymers, etc., to irradiation. This avoidance can be accomplished by using the extrusion coating method of multilayer film production, as described above.

As noted above, the present films may optionally be subjected to an energetic radiation treatment, including, but not limited to corona discharge, plasma, flame, ultraviolet, and high energy electron treatment. Irradiation with ultraviolet or high energy electron treatment may be carried out in such a manner as to produce a crosslinked polymer network. In this case, such irradiation is preferably performed prior to any orientation step and, in the case of an electron beam irradiated SARAN™-containing barrier structure, prior to extrusion coating of the barrier component. Electronic radiation dosages are referred to herein in terms of the radiation unit "RAD," with one million RADs or a megarad being designated as "MR." A suitable radiation dosage of high energy electrons is in the range of up to about 12 MR, more preferably about 2 to about 9 MR. However, irradiation after orientation, regardless of structure, and performed at lower dosage levels, is also within the scope of the present invention.

For those embodiments in which the film is a multilayer film, each layer will generally serve some function or provide some characteristic to the overall structure. For example, the chemical composition and thickness of an outer layer intended can be selected so that the layer is suited for use as a sealing layer, i.e., suited to heat-sealing and/or RF (radio frequency) sealing, and, depending on the intended end use application for this outer layer, other factors such as grease-resistance may be of importance. The composition of the other outer layer of the film may be chosen for abuse resistance or, where a given end-use application requires a folded over "lap" seal, sealability to the seal layer. If an inner barrier layer is required, its particular chemical composition and thickness will be selected to provide a degree of gas or moisture impermeability needed for a specific packaging end use, i.e., a specific product to be packaged in the film. Further inner layers may serve to provide the film with added bulk, increased shrinkablility, greater interlayer adhesion, increased elasticity, increased gas-permeability with respect to one or more specific gases, as well as any combination of these properties.

The thermoplastic films of the present invention contain homogeneous copolymers resulting from the copolymerization of a $C_2$–$C_8$ olefin monomer and a vinyl aromatic comonomer. Ethylene and propylene are preferred $C_2$–$C_8$ olefin monomers, and styrene is a preferred vinyl aromatic comonomer. Other suitable vinyl aromatic comonomers include vinyl naphthalene and vinyl anthracene.

For purposes of the present invention, the alpha-olefin/vinyl aromatic copolymer, preferably ethylene/styrene copolymer, may be present in either a monolayer film or in one or more layers of a multilayer film structure. As such, the alpha-olefin/vinyl aromatic copolymer may comprise 100% of the layer in which it is present, or it may be present in a blend with another thermoplastic homopolymer or copolymer.

If a heat-shrinkable structure is prepared using a blend of the olefin/vinyl aromatic copolymer with at least one member selected from the group consisting of ethylene/alpha-olefin copolymer, ethylene/vinyl acetate copolymer, ethylene/alkyl acrylate copolymer, ethylene/acrylic acid copolymer, a metal neutralized salt of ethylene/acrylic acid copolymer, low density polyethylene, the present olefin/vinyl aromatic copolymer provides the resulting film with elastic memory properties similar to those of polyvinyl chloride. Plasticizer may also be blended with the alpha-olefin/vinyl aromatic copolymer used in film according to the present invention.

Furthermore, if present in a blend with any of a wide range of thermoplastic homopolymers or copolymers, olefin/vinyl aromatic copolymer will improve the toughness the resultant film structure. If blended with atactic or syndiotactic polystyrene, impact resistance is improved and flex cracks (caused by brittleness) are reduced. If blended with ethylene or propylene homopolymers and/or copolymers, the olefin/vinyl aromatic copolymers improve clarity and increase gas and moisture vapor permeability of the overall film structure. Olefin/vinyl aromatic copolymer may also be employed as a blending modifier in a seal layer, to enhance RF sealability or to enhance low-temperature seal initiation for heat sealing.

The olefin/vinyl aromatic copolymer, either alone in a monolayer film, and/or alone as a surface layer of a multilayer film, and/or as a component in a blend in either a mono- or multilayer film, may be employed to improve the printability of the film. Specifically, the present copolymers will improve printability over both known ethylene/alpha-olefin copolymers and styrene homopolymers. It is the polarizability imparted by the aryl group of the olefin/vinyl aromatic copolymer which is believed to provide improved wettability and, therefore, improved printability if present in the external surface layer of a film.

It is this polarizability of the aryl group which also is believed to make the present copolymers RF active, both as a component in a blend, as discussed above, and especially as the sole component of an RF sealing layer, or a susceptor layer. A "susceptor layer" is a layer within a multilayer structure which is either immediately adjacent to the sealing layer, or close enough to the sealing layer, so that in being heated by RF irradiation, the susceptor layer in turn heats the sealing layer to assist in the sealing process.

RF sealability is desired if olefin-based packaging materials are to compete with plasticized polyvinyl chloride (PVC) in the medical packaging arena. Although the downside risks of PVC are well known, such as the possibility of migration of the plasticizer (preferably, dioctyl phthalate) into a packaged medical solution, and reaction of the PVC itself with the packaged medical solution and, the fact that PVC becomes brittle at low temperatures, PVC has several specific performance characteristics which are required for the packaging for medical solutions and for other medical applications such as ostomy pouches and bags for holding various medical fluids, such as fluids suitable for intravenous end use. That is, PVC provides the needed characteristics for end-use applications which require collapsibility, transparency, adequate mechanical strength, and the ability to resist the relatively high temperatures required for heat sterilization. Olefin-based materials are being developed which can compete with PVC from a performance perspective, but many medical packaging convertors are still using RF sealing equipment.

Thus, olefin-based materials for use in the medical packaging industry often must be RF sealable. Such materials include the films used to make the pouches and fitments which are required to establish fluid communication between the container and the outside environment. In general, fitments are tubes, which can be monolayer or multilayer articles. In order to form the pouch, the outside outer layer of the fitment must seal to the inside outer layer of the film. Preferably, the inside outer layer of the film and the outside outer layer of the fitment are identical in chemical composition. Thus, if the inside outer layer of the film is RF active, the outside outer layer of the fitment is preferably composed of the same RF active polymer or blend. If the film has a sealing layer which is not RF active but relies on an interior susceptor layer, the fitment preferably has an outermost layer identical to film's sealing layer and includes an interior susceptor layer as well.

Another application for olefin/vinyl aromatic copolymer is incorporation into a protective patch for use on a heat-shrinkable, thermoplastic bag used in the packaging of bone-in meat. The patch is preferably made by extruding a thermoplastic film comprising olefin/aromatic vinyl copolymer. This patch film can be a monolayer film having olefin/vinyl aromatic copolymer present alone or in a blend, or the patch film can be a multilayer film having olefin/vinyl aromatic copolymer in at least one layer, either alone or in a blend. In the production of a multilayer patch film, a film tube is collapsed, irradiated, heated, inflated, and oriented, and is then collapsed again, and flattened such that the inside outer layer of the tube adheres to itself, i.e., is a self-adhering layer, thereby forming the multilayer patch film. Patches cut from the patch film are adhered to the outer surface of heat-shrinkable bags used in packaging bone-in cuts of meat, in order to protect the bag from being punctured by the bones. In the instance of a patch comprising a multilayer film, olefin/vinyl aromatic copolymer may be present in any layer of a multilayer patch, including the self-adhering layer, in order to improve the overall performance of the patch film, especially the impact resistance of the patch film.

According to the present invention, thermoformed trays, for example foam trays for holding meat, can comprise olefin/vinyl aromatic copolymer. Laminating a film onto foamed and unfoamed polystyrene is known, and is used to provide gas barrier properties to the trays, and/or to provide the trays with a surface for sealability to a lid and/or tray overwrap. However, delamination of the film from the polystyrene web produces unsightly blisters and other forms of product failure. In accordance with the present invention, olefin/vinyl aromatic copolymer, particularly ethylene/styrene copolymer, may be employed in an outer sealing layer of a multilayer film, this outer sealing layer to be adhered directly to a foamed tray. Alternatively, ethylene/styrene copolymers may be employed in an adhesive layer adjacent to a polystyrene bonding layer, in order to prevent delamination of the film.

The following examples are representative of the preferred embodiments of the present films containing homogeneous single site catalyzed olefin/vinyl aromatic copolymers.

EXAMPLES 1–15 AND COMPARATIVE EXAMPLES 16–21

Several copolymers of ethylene and styrene were prepared, according to procedures substantially as described hereinbelow. A polymerization reactor was charged with dry, deoxygenated toluene, purified styrene (vacuum distilled over calcium hydride), a solution of methyl aluminoxane in toluene (10% aluminum by weight), and a suitable catalyst, as set forth hereinbelow. Ethylene gas was introduced at the below-indicated pressure, while maintaining the below-indicated polymerization temperature. After less than 50% of the styrene comonomer had been consumed, the resulting polymerization reaction was terminated by the addition of methanol.

For Examples 1–12, the polymerization was carried out in a glass polymerization reactor, catalyzed with isopropylidene-(cyclopentadienyl)(9-fluorenyl)zirconium dichloride. Ethylene gas was introduced at about 30 psi, while maintaining a polymerization temperature of about 40° C.

For Examples 13–15, the polymerization was carried out in a 2-liter Parr Reactor equipped with an internal cooling coil. The polymerization was catalyzed with $Me_2Si[Cp(Me)_4][N\text{-tert-Bu}]$titanium dichloride. Ethylene gas was introduced at about 180 psig, while maintaining a polymerization temperature of about 90° C.

Styrene mer content and overall purity (i.e., less than 5% polystyrene homopolymer impurity present) of the resulting copolymers were ascertained using $^{13}C$-nmr spectroscopy. Molecular weights were analyzed by gel permeation chromatography (GPC), with polystyrene reference standards. Table IA, below, identifies the prepared copolymers of Examples 1–15, together with analytical results providing the styrene mer content and molecular weight data for each of Examples 1–15. Table IB provides molecular weight, copolymer composition, and density for Comparative Examples 16–21, each of which was a commercially-available homogeneous ethylene/alpha-olefin copolymer.

TABLE IA (Examples 1–15)

| Example Number | wt. % Styrene mer in ethylene/styrene copolymer | $M_n \times 10^{-3}$ | $M_w \times 10^{-3}$ | $M_w/M_n$ |
|---|---|---|---|---|
| 1 | 16 | 161 | 313 | 1.9 |
| 2 | 30 | 131 | 301 | 2.3 |
| 3 | 31 | 65 | 111 | 1.7 |
| 4 | 23 | 76 | 144 | 1.9 |
| 5 | 9 | 210 | 673 | 3.2 |
| 6 | 12 | 280 | 867 | 3.1 |
| 7 | 23 | 221 | 662 | 3.0 |
| 8 | 29 | 79 | 177 | 2.2 |
| 9 | 11 | 48 | 123 | 2.6 |
| 10 | 30 | 86 | 178 | 2.7 |
| 11 | 11 | 90 | 274 | 3.0 |
| 12 | 18 | 67 | 178 | 2.7 |
| 13 | 18 | 252 | 140 | 1.8 |
| 14 | 8 | 283 | 149 | 1.9 |
| 15 | 42 | 177 | 104 | 1.7 |

TABLE IB (Comparative Examples 16–21)

| Comparative Example Number | Copolymer & Density (g/cc) | $M_n \times 10^{-3}$ | $M_w \times 10^{-3}$ | $M_w/M_n$ |
|---|---|---|---|---|
| 16 | ethylene/octene; 0.901 | 47 | 103 | 2.2 |
| 17 | ethylene/butene; 0.888 | 56 | 101 | 1.8 |
| 18 | ethylene/butene; 0.910 | 64 | 116 | 1.8 |
| 19 | ethylene/butene/hexene; 0.910 | 49 | 90 | 1.8 |
| 20 | ethylene/hexene; 0.920 | 49 | 104 | 2.1 |
| 21 | ethylene/hexene; 0.923 | 63 | 118 | 1.9 |

For each of Examples 1–15, and Comparative Examples 17–21, the relaxed and unrelaxed storage moduli for the beta relaxation, and the peak beta relaxation temperature, were determined using a Rheometrics RSA-II Solids Analyzer, in accordance with ASTM D 5026-89 and ASTM D 4065-90. The test specimens were prepared and conditioned in accordance with ASTM D 1928, Procedure C, and ASTM D618-61, as follows:

A one gram sample of polymer was placed between separated, horizontally-positioned MYLAR™ sheets of a press assembly (comprising a Carver Laboratory Press and stainless steel supporting plates), the resin powder being placed in the center of a lower MYLAR™ sheet, which was positioned above a lower stainless steel plate. Thereafter, an upper MYLAR™ sheet was placed over and in contact with the powder, after which an upper stainless steel plate was placed over the upper MYLAR™ sheet, resulting in an assembly containing the resin powder. After placing this assembly in the press, the assembly was heated to 385° F. for 5 minutes without any substantial additional pressure being applied to the resin powder. After 5 minutes of this heating, 22,000 pounds of force was hydraulically applied to the resin by the press, this 22,000 pounds of force being maintained for 5 minutes, as the powder melted and was pressed into a film having a thickness of approximately 2 mils. Thereafter, this additional pressure was maintained for 5 additional (for a total of 10 minutes in the press), while the film was allowed to cool at a rate of about 15° C.±2° C./min, until a platen temperature of about 100° F. was obtained, after which the film was removed from the press, and was allowed to cool to ambient temperature. The film was thereafter conditioned by being held for at least 40 hours at 73° F., at 50% relative humidity.

Duplicate runs were made on each sample, with the resulting data sets being merged, and a two-point smoothing algorithm, supplied in the Rheometrics Rhios 4.2.2 data analysis software, was used to obtain an average spectrum. The mass percent crystallinity was calculated from the integration of the second heat melting endotherm obtained using a Perkin Elmer DSC-7 Differential Scanning Calorimeter, with the assumption of 289 J/g for the melting enthalpy of crystalline regions in homopolymer polyethylene.

FIG. 1 is a plot of a ratio of relaxed to unrelaxed storage moduli (for the beta-relaxation) versus mass percent crystallinity, for pressed, unoriented films of: (1) the ethylene/styrene copolymers of Examples 1–15, as well as (2) the homogeneous ethylene/alpha-olefin copolymers of Comparative Examples 17–21. As can be seen in FIG. 1, the ratio of the beta-relaxation storage moduli (i.e., similar to the Young's Modulus, which is a measure of the stiffness of a material) is greater for the ethylene/styrene copolymers than for the comparative homogeneous ethylene/alpha-olefin copolymers also graphically represented in FIG. 1. As illustrated in FIG. 1, relative to the films of the comparative homogeneous ethylene/ alpha-olefin copolymer, the films of ethylene/styrene copolymer exhibited a higher amorphous phase stiffness above the beta relaxation temperature.

Figure 2:
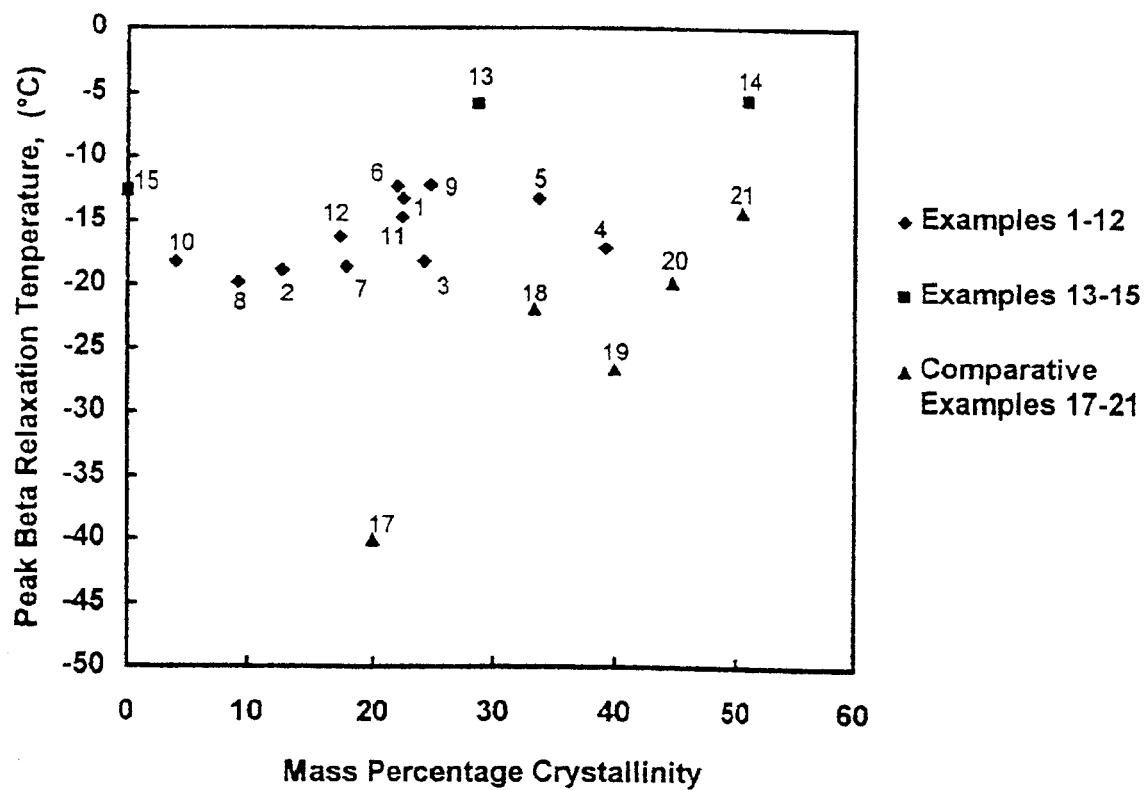
FIG. 2 is a plot of data points for the films of Examples 1–15 and Comparative Examples 17–21, the plot being of: (a) peak beta relaxation temperature, versus (b) mass percent crystallinity.

FIG. 2 is a plot of peak beta relaxation temperature versus mass percent crystallinity, for pressed, unoriented films of: (1) the ethylene/styrene copolymers of Examples 1–15, as well as (2) the homogeneous ethylene/alpha-olefin copolymers of Comparative Examples 17–21. As can be seen in FIG. 2, the peak beta relaxation temperature is greater for the ethylene/styrene copolymers than for the comparative homogeneous ethylene/alpha-olefin copolymers also graphically represented in FIG. 2.

EXAMPLE 22

Hot-pressed films of the ethylene/styrene copolymer of Example 12, having the approximate dimensions of 0.020× 2.5×2.5 inches, were prepared and oriented on a laboratory biaxial orientation apparatus (known as a TM Long Film Stretcher™, obtained from the TM Long Company Inc., of Somerville, N.J.) By an analogous procedure, oriented hot-pressed films were prepared using the homogeneous ethylene/octene copolymer of Comparative Example 16, these comparative films having the approximate pre-orientation dimensions of 0.014×2.5×2.5 inches. For the copolymers of Examples 12 and 16, the Vicat softening temperatures, as estimated from the elastic moduli, were 95° C. and 90° C., respectively.

The orientation conditions for each of the pressed films were as follows:

Mode of Orientation: Simultaneous biaxial
Temperature During Orientation: 185° F. (85° C.)
Orientation Rates: 2 and 20 inches per second After orientation, all films were cooled with ambient air, i.e., "set", removed from the apparatus, and held at about 73° C. for at least two days before testing. Tensile modulus (ASTM D 882-91, Method A) and free shrink properties were tested along each of the two orthogonal orientation directions on the film samples, and were then averaged. Impact strength (ASTM D 3763-86) was calculated by dividing the total energy to break by the average film thickness. Impact stress was calculated as the maximum force at impact divided by the average sample thickness. Table II below shows the comparative data for these two samples.

TABLE II

| Example Number | Orientation Rate (in/sec) | Film Thickness (mil) | Tensile Modulus (psi) | Free Shrink @ 85° C. (%) | Free Shrink @ 95° C. (%) | Impact Strength (ft-lb/mil) | Impact Stress (lb/mil) |
|---|---|---|---|---|---|---|---|
| 12 | 2 | 1.8 | 16,042 | 35 | 62 | 1.41 | 35.05 |
|  | 20 | 1.7 | 21,110 | 36 | 63 | 1.00 | 30.71 |
| 16* | 2 | 1.2 | 17,605 | 38 | 65 | 0.88 | 22.85 |
|  | 20 | 1.0 | 19,215 | 35 | 64 | 0.85 | 26.06 |

*The pressed films of Example 16 were exposed to a high-enrgy electron beam source at an estimated, preferred dose of 54 Kilograys (Kg) prior to orientation.

The above data show similar free shrink values and moduli for the two types of resins, while the thickness-normalized impact properties are 20–60% higher for the ethylene-styrene copolymer.

EXAMPLE 23

Hot Air Orientation of Multilayer Film Containing Propylene/Ethylene Copolymer and Ethylene/ Styrene Copolymer A palindromic three-layer coextruded film having an A/B/A structure is oriented out of hot air at 115° C. The outer "A" layers are a propylene/ethylene copolymer having 3% by weight of ethylene. The inner "B" layer is an ethylene/ styrene copolymer having 2% by mole of styrene (hereinafter "ES Copolymer #2"). The relative thickness of the A/B/A layers is 25 percent/50 percent/25 percent, respectively.

EXAMPLE 24

Hot Air Orientation of Multilayer Film Containing Propylene Homopolymer and Ethylene/Styrene Copolymer A palindromic three-layer coextruded film having an A/B/A structure is oriented out of hot air at 115° C. The outer "A" layers are a propylene homopolymer. The inner "B" layer is a propylene/styrene copolymer having 19% by mole of styrene (hereinafter PS Copolymer #3"). The relative thickness of the A/B/A layers is 25 percent/50 percent/25 percent, respectively.

EXAMPLE 25

3-Layer Oriented Barrier Film Produced by Extrusion Coating

A two-layer coextruded precursor film is formed, the precursor film having the structure: outer layer #1/inner layer #1. Outer layer #1 is ELVAX 3128™ ethylene vinyl acetate resin, having 8.9% vinyl acetate (hereinafter, "EVA #1"), obtained from the DuPont de Nemours Corporation, of Wilmington, Del. Inner layer #1 is an ethylene/styrene copolymer having 4 mole percent styrene (hereinafter "ES Copolymer #4"). The precursor film is irradiated to 2 MR and thereafter extrusion-coated with a barrier layer of a vinylidene chloride/methyl acrylate copolymer (hereinafter "VDCMA Copolymer"), preferably SARAN™ VDCMA Copolymer obtained from The Dow Chemical Company, of Midland, Mich., followed by coating with an outer abuse layer known as LD 318.92™ ethylene vinyl acetate having 9 percent vinyl acetate (hereinafter "EVA #2"), obtained from Exxon Chemical Company, of Baytown, Tex., to yield a resultant four layer film having the structure:

EVA #1/ES Copolymer #4//VDCMA Copolymer/EVA #2

The four layer film is then oriented out of hot water, via a trapped bubble method, with both the preheat and hot bath temperatures at 195° C.

EXAMPLE 26

5-Layer Oriented Barrier Film Produced by Extrusion Coating

A two-layer coextruded precursor film is formed, the precursor film having the structure: outer layer #1/inner layer #1. Outer layer #1 is EVA #1. Inner layer #1 is ES Copolymer #4. The precursor film is irradiated to 2 MR and thereafter extrusion-coated with a barrier layer of VDCMA Copolymer, followed by a layer of ES Copolymer #4, followed by an outer abuse layer of EVA #2, to yield a resultant four-layer film having the basic structure:

EVA #1/ES Copolymer #4//VDCMA Copolymer/ES Copolymer #4/EVA #2

The five layer film is then oriented by a trapped bubble method out of hot water, with both the preheat and hot bath temperatures at 195° C.

EXAMPLE 27

6-Layer Oriented Barrier Film Produced by Extrusion Coating

A three-layer coextruded precursor film is formed, having the structure: outer layer #1/inner layer #1/inner layer #2. Outer layer #1 is EVA #1; inn layer #1 is ES Copolymer #4; inner layer #2 is Escorene LD-720.92™ ethylene vinyl acetate copolymer having 19% vinyl acetate (hereinafter "EVA #3"), obtained from Exxon Chemical Company, of Baytown, Tex. The precursor film is irradiated to 2 MR and thereafter extrusion-coated with a layer of VDCMA Copolymer, followed by a layer of ES Copolymer #4, followed by a layer of EVA #2, to produce a six-layer film having the structure:

EVA #1/ES Copolymer #4/EVA #3//VDCMA/ES Copolymer #4/EVA #2

The six-layer film is then oriented by a trapped bubble method out of hot water, with both the preheat and hot bath temperatures at 195° C.

EXAMPLE 28

4-Layer Oriented Barrier Film Produced by Extrusion Coating

A two-layer coextruded precursor film is formed having an inner layer of an ethylene/styrene copolymer having 9 mole percent styrene (hereinafter "ES Copolymer #5"), and a second layer of EVA #3.

Following irradiation, the precursor film is extrusion-coated with a barrier layer of VDCMA, followed by a layer of EVA #2. Thereafter, the coated film is oriented out of hot water by a trapped bubble technique. The multilayer structure obtained is:

ES Copolymer #5/EVA #3//VDCMA/EVA #2

EXAMPLE 29

3-Layer Coextruded Oriented Film

A palindromic three-layer coextruded film having an A/B/A structure is oriented out of hot air at 115□° C. The outer "A" layers are an ethylene/styrene copolymer having 6 mole percent styrene (hereinafter "ES Copolymer #6"). The inner "B" layer is PE 1335™ ethylene vinyl acetate copolymer having 3.3% vinyl acetate (hereinafter "EVA #4"), obtained from Rexene, of Dallas, Tex. The relative thickness of the A/B/A layers is 25 percent/50 percent/25 percent, respectively.

EXAMPLE 30

3-Layer Coextruded Oriented Film Containing Core Layer Blend

A palindromic three-layer coextruded film having an A/B/A structure is oriented out of hot air at 115□° C. The outer "A" layers are a blend of 50% ES Copolymer #6 and 50% of EVA #3. The inner "B" layer is an ethylene vinyl alcohol copolymer (hereinafter "EVOH Copolymer"). The relative thickness of the A/B/A layers is 25 percent/50 percent/25 percent, respectively.

EXAMPLE 31

5-Layer Coextruded Oriented Film Containing Core Layer Blend

A palindromic five-layer coextruded film having an A/B/C/B/A structure is oriented out of hot air at 113□° C. The outer "A" layers are EVA #2. Inner "C" layer is EVOH Copolymer, and serves an a barrier to gaseous oxygen. Inner "B" layers are EVA #3, and serve as tie layers.

EXAMPLE 32

5-Layer Coextruded Oriented Film Containing EVOH Copolymer Barrier Layer

A palindromic five-layer coextruded film having an A/B/C/B/A structure is oriented out of hot air at 113° C. The outer "A" layers are ES Copolymer #2. The inner "C" layer is EVOH Copolymer. The inner "B" layers are EVA #3, and serve as tie layers.

EXAMPLE 33

7-Layer Coextruded Oriented Barrier Film Containing Nylon, Tie Layers, and Outer Ethylene Styrene Layers A palindromic seven-layer coextruded film having an A/B/C/D/C/B/A structure is oriented out of hot air at 113□° C. The outer "A" layers are ES Copolymer #2. The inner "D" layer is EVOH copolymer. The inner "B" layers are EVA #3, and serve as tie layers. The inner "C" layers are nylon 6.

EXAMPLE 34

7-Layer Coextruded Oriented EVOH Barrier Film Containing Tie Layers and Only One ES Copolymer Outer Layer A seven-layer film is coextruded and quenched. The seven-layer film has a first outer layer of a heterogeneous ethylene/octene copolymer; followed by inner layer #1, of an ethylene vinyl acetate copolymer having 3.5% vinyl acetate (hereinafter "EVA #5"); followed by an inner layer #2, which serves as a tie layer and is of an anhydride-grafted polyolefin; followed by inner layer #3, of EVOH Copolymer; followed by inner layer #4, which serves as a tie layer and is of an anhydride grafted polyolefin; followed by inner layer #5, of EVA #5; followed by outer layer #2, of ES Copolymer #1.

EXAMPLE 35

Thermoformed Foam Sheet Having Film Laminated Thereto

The multilayer film of Example 14 is adhered to a foamed polystyrene web, using heat and pressure. Outer layer #2 bonds directly to the foamed polystyrene web. The foamed polystyrene with the seven-layer film laminated thereto is thereafter thermoformed into a tray.

EXAMPLE 36

5-Layer Coextruded and Quenched Film Containing EVOH Copolymer Barrier Layer A five-layer multilayer film is coextruded and quenched. The multilayer film has a first layer of an ethylene vinyl acetate copolymer; followed by a second layer of a metal neutralized salt of an ethylene acrylic acid copolymer; followed by a third layer of an ethylene vinyl acetate copolymer; followed by a fourth layer of an ethylene styrene copolymer having 30% by mole of styrene (hereinafter ES Copolymer #7); followed by a fifth layer of polystyrene.

EXAMPLE 37

Thermoformed Metallized Web Having Film Laminated Thereto

The five-layer multilayer film of Example 16 is adhered to a metallized polyester web with an adhesive. The resultant laminate structure is thermoformed into a tray.

EXAMPLE 38

Eight-Layer Coextruded Film Thermoformed into Tray

An eight-layer film is coextruded as a multilayer film, followed by quenching. The eight-layer film has: a first layer of an ethylene vinyl acetate copolymer; a second-layer of metal neutralized salt of an ethylene acrylic acid copolymer; a third layer of an ethylene vinyl acetate copolymer; a fourth layer of an adhesive resin; a fifth layer of an ethylene vinyl alcohol copolymer; a sixth layer of an adhesive resin; a seventh layer of an ethylene styrene copolymer having 25% by mole of styrene; and, an eighth layer of polystyrene. The film is thermoformed into a tray.

EXAMPLE 39

Preparation of Patch and Bone-Guard Patch Bags

A two-layer film, in the form of a tube, is coextruded. The two-layer film has a first layer (the inside layer of the tube) of an ethylene vinyl acetate having 25% vinyl acetate, and a second layer (the outside layer of the tube) of a blend of 50 weight percent of an ethylene/styrene copolymer having 7% by mole of styrene, and 50 weight percent of an ethylene/vinyl acetate copolymer having 8% vinyl acetate. The tube is irradiated and then oriented out of hot air. Following orientation the tube is collapsed and flattened such that the first layer adheres to itself and the tube, thereby forming the tube into a four layer film. Thereafter the four-layer film is cut into patches which are adhered to a tube of film suitable for the preparation of bone-guard patch bags.

EXAMPLE 40

Preparation of Medical Pouch Using Multilayer Cast, Coextruded Four-Layer Film A multilayer film is formed by downward cast coextrusion. The four-layer film has: a first layer of an ethylene propylene copolymer; a second layer which serves as an adhesive layer; a third layer of an ethylene styrene copolymer having 25% by mole of styrene; and, a fourth layer of an ethylene propylene copolymer. The four-layer film is converted into a pouch suitable for use in medical applications. During the conversion to the pouch structure, the film is RF sealed, with the fourth layer being a sealing layer and the third layer being a susceptor layer.

EXAMPLE 41

Preparation of Medical Pouch Using Multilayer Cast, Coextruded Five-Layer Film A film is formed by downward cast coextrusion. The five-layer film has: a first layer of a copolyester; a second layer which serves as an adhesive layer; a third layer of heterogeneous ethylene octene copolymer having a density of 0.905 g/cc; a fourth layer which serves as an adhesive layer; a fifth layer of an ethylene/styrene copolymer having 30% by mole of styrene. During conversion of the film into a pouch for medical applications, the film is RF sealed.

EXAMPLE 42

Preparation of Medical Pouch Using Coextruded Four-Layer Film Containing Susceptor Layer A multilayer film is formed using a downward cast coextrusion process. The four-layer film has: a first layer of a copolyester; followed by a second layer which serves as an adhesive layer; followed by a third layer, which is a blend of 50% of an ethylene/vinyl acetate copolymer and 50% of an ethylene/styrene copolymer having 35% by mole of styrene; and a fourth layer of a modified ethylene/propylene copolymer. During conversion of the film into a pouch for medical applications the third layer acts as an RF susceptor layer.

The foregoing description of preferred embodiments of the invention has been presented for purposes of illustration and description. It is not intended to be exhaustive or to limit the invention to the precise form disclosed, and modifications and variations of the invention are possible in light of the above teachings. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A heat shrinkable film comprising a substantially oriented film layer comprising a homogeneous alpha-olefin/vinyl aromatic copolymer in an amount of from about 30 to 100 weight percent, based on the weight of the film layer, wherein the homogeneous alpha-olefin/vinyl aromatic copolymer has a vinyl aromatic mer content of from about 1–50 mole percent, and the film has a free shrink, at 90° C., of at least 30 percent in at least one direction.

2. The film according to claim 1, wherein the film layer has a modulus of from about 5,000 to 150,000 psi.

3. The film according to claim 2, wherein the film layer has a modulus of from about 10,000 to 150,000 psi.

4. The film according to claim 3, wherein the film layer has a modulus of from about 15,000 to 50,000 psi.

5. The film according to claim 1, wherein the film is a multilayer film.

6. The film according to claim 5, wherein the film is symmetrical.

7. The multilayer film according to claim 5, comprising a first layer and a second layer, wherein the first layer is an oxygen barrier layer and the second layer comprises the homogeneous alpha-olefin/vinyl aromatic copolymer.

8. The multilayer film according to claim 7, wherein the oxygen barrier layer comprises at least one member selected from the group consisting of ethylene/vinyl alcohol copolymer, polyvinylidene chloride, polyamide, polyacrylonitrile, polyester, and silica.

9. The multilayer film according to claim 5, comprising a first layer and a second layer, wherein the first layer comprises at least one member selected from the group consisting of polyolefin, polyamide, polyester, and the second layer comprises the homogeneous alpha-olefin/vinyl aromatic copolymer.

10. A multilayer film according to claim 9, wherein the polyolefin comprises at least one member selected from the group consisting of polyethylene homopolymer, polypropylene homopolymer, ethylene/aliphatic alpha-olefin copolymer, ethylene/vinyl ester copolymer, ethylene/acrylic ester copolymer, ethylene/acrylic acid copolymer, propylene/aliphatic alpha-olefin copolymer and ionomer.

11. The film according to claim 1, wherein the film layer comprises a composition comprising:

at least one member selected from the group consisting of homogeneous ethylene/vinyl aromatic copolymer and homogeneous propylene/vinyl aromatic copolymer; and at least one member selected from the group consisting of polyethylene homopolymer, polypropylene homopolymer, ethylene/aliphatic alpha-olefin copolymer, ethylene/vinyl ester copolymer, ethylene/acrylic ester copolymer, ethylene/acrylic acid copolymer, polystyrene homopolymer, styrene/aliphatic diene copolymer, propylene/aliphatic alpha-olefin copolymer, and ionomer.

12. The film according to claim 1, wherein the homogeneous alpha-olefin/vinyl aromatic copolymer comprises ethylene mer and styrene mer.

13. The film according to claim 12, wherein the ethylene mer is present in an amount of from about 75 mole percent to about 99 mole percent, and the styrene mer is present in an amount of from about 1 mole percent to 25 mole percent.

14. The film according to claim 1, wherein the homogeneous alpha-olefin/vinyl aromatic copolymer comprises propylene mer and styrene mer.

15. The film according to claim 1, wherein the homogeneous alpha-olefin/vinyl aromatic copolymer comprises a crosslinked polymer network.

16. A printed film comprising a film layer comprising homogeneous alpha-olefin/vinyl aromatic copolymer in an amount of from about 30 to 100 weight percent, based on the weight of the film layer, wherein the film layer has printing thereon, and wherein the homogeneous alpha-olefin/vinyl aromatic copolymer has a vinyl aromatic mer content of from about 1–50 mole percent.

17. The printed film according to claim 16, wherein the printed film is a multilayer film, and the film layer is an outer film layer, and the printing is on an outer surface of the outer film layer.

18. A multilayer film comprising an outer sealing layer, an inner oxygen barrier layer, an inner core layer, and an outer abuse layer, wherein:

at least one member selected from the group consisting of the outer sealing layer and the inner core layer comprises homogeneous alpha-olefin/vinyl aromatic copolymer;

polyamide is present in at least one member selected from the group consisting of the inner oxygen barrier layer, the inner core layer, and the outer abuse layer.

19. A thermoformed article comprising a multilayer film comprising an outer sealing layer, an inner oxygen barrier layer, an inner core layer, and an outer abuse layer, wherein:

at least one member selected from the group consisting of the outer sealing layer and the inner core layer comprises homogeneous alpha-olefin/vinyl aromatic copolymer;

polyamide is present in at least one member selected from the group consisting of the inner oxygen barrier layer, the inner core layer, and the outer abuse layer.

20. A patch bag comprising a heat-shrinkable patch adhered to a heat-shrinkable bag, the heat-shrinkable patch comprising a first heat-shrinkable film, and the heat-shrinkable bag comprising a second heat-shrinkable film, wherein at least one member selected from the group consisting of the first heat-shrinkable film and the second heat-shrinkable film comprises a film layer comprising homogeneous alpha-olefin/vinyl aromatic copolymer.

* * * * *